(12) United States Patent
Sridhar et al.

(10) Patent No.: US 9,615,137 B2
(45) Date of Patent: Apr. 4, 2017

(54) ASSOCIATING INFORMATION WITH ELECTRONIC PROGRAM GUIDE ENTRIES

(75) Inventors: Avinash Sridhar, Cranbury, NJ (US); David Anthony Campana, Kirkland, WA (US); David Brian Anderson, Hamilton, NJ (US)

(73) Assignee: Thomson Licensing, Issy les moulineaux (FR)

( * ) Notice: Subject to any disclaimer, the term of this patent is extended or adjusted under 35 U.S.C. 154(b) by 0 days.

(21) Appl. No.: 13/991,651

(22) PCT Filed: Dec. 2, 2011

(86) PCT No.: PCT/US2011/063066
§ 371 (c)(1),
(2), (4) Date: Jun. 5, 2013

(87) PCT Pub. No.: WO2012/087540
PCT Pub. Date: Jun. 28, 2012

(65) Prior Publication Data
US 2013/0268974 A1    Oct. 10, 2013

Related U.S. Application Data

(60) Provisional application No. 61/425,793, filed on Dec. 22, 2010.

(51) Int. Cl.
H04N 5/445      (2011.01)
H04N 21/482     (2011.01)
H04N 21/41      (2011.01)
H04N 21/422     (2011.01)
H04N 21/462     (2011.01)
(Continued)

(52) U.S. Cl.
CPC ....... *H04N 21/482* (2013.01); *H04N 21/4126* (2013.01); *H04N 21/42209* (2013.01); *H04N 21/4622* (2013.01); *H04N 21/4722* (2013.01); *H04N 21/8133* (2013.01); *H04N 21/84* (2013.01)

(58) Field of Classification Search
CPC ..................... H04N 21/462; H04N 21/4622
See application file for complete search history.

(56) References Cited

U.S. PATENT DOCUMENTS 8,359,399 B2 *   1/2013  Landow et al. ............. 709/231
2002/0194619 A1 * 12/2002  Chang et al. .................. 725/134
(Continued)

FOREIGN PATENT DOCUMENTS

JP    2004023345    1/2004
JP    2007295451   11/2007
(Continued)

*Primary Examiner* — Gigi L Dubasky
(74) *Attorney, Agent, or Firm* — Brian J. Dorini; Reitseng Lin

(57) ABSTRACT

An information processor determines what media content is currently and/or could be displayed on a primary viewing screen. The information processor then mines other sources of information to obtain associated information. This information can then be accessed by a user as raw data and/or further processed by the information processor and then accessed by the user. Typically, the associated information is displayed on a secondary screen. This allows, for example, an electronic programming guide to be enhanced with additional information.

16 Claims, 2 Drawing Sheets

(51) Int. Cl.
*H04N 21/4722* (2011.01)
*H04N 21/81* (2011.01)
*H04N 21/84* (2011.01)

(56) References Cited

U.S. PATENT DOCUMENTS

| | | | |
|---|---|---|---|
| 2003/0226147 | A1 | 12/2003 | Richmond et al. |
| 2005/0283800 | A1* | 12/2005 | Ellis et al. ........................ 725/40 |
| 2006/0123448 | A1* | 6/2006 | Ma et al. ........................ 725/51 |
| 2008/0082922 | A1* | 4/2008 | Biniak ............... H04N 7/17318 |
| | | | 715/719 |
| 2008/0250452 | A1* | 10/2008 | Iwamoto ................ H04H 20/93 |
| | | | 725/39 |
| 2009/0037954 | A1 | 2/2009 | Nagano |
| 2009/0216745 | A1 | 8/2009 | Allard |
| 2009/0265741 | A1 | 10/2009 | Kinoshita et al. |
| 2010/0064321 | A1 | 3/2010 | Lee et al. |
| 2010/0306803 | A1* | 12/2010 | Ohbitsu ................ H04H 20/93 |
| | | | 725/51 |

FOREIGN PATENT DOCUMENTS

| | | |
|---|---|---|
| JP | 2009017259 | 1/2009 |
| JP | 2009218734 | 9/2009 |
| JP | 2010512095 | 4/2010 |

\* cited by examiner

ASSOCIATING INFORMATION WITH ELECTRONIC PROGRAM GUIDE ENTRIES

This application claims the benefit, under 35 U.S.C. §365 of International Application PCT/US2011/063,066, filed 2 Dec. 2011, which accordance with PCT Article 21(2) on 28 Jun. 2012, in English and which claims the benefit of United States Provisional Application Ser. No. 61/425,793 filed 22 Dec. 2010.

BACKGROUND

Electronic program guides help media users navigate through hundreds or even thousands of available program channels. The guides are usually ordered by time and channel and include a title of a given program. Sometimes the guides also include a short description of what the program is about. However, a lot of programming does not have this descriptive text.

SUMMARY

By leveraging at least one additional source of information, information associated with a given program can be mined and relayed to a user of the program guide to augment information provided by the original program guide. This is especially useful for programming that is spontaneous or rapidly evolving such as news programs and the like where descriptions typically just say "news." Thus, users can now receive associated information regarding the content of the programming that is or most likely will be discussed during that particular program.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter can be employed, and the subject matter is intended to include all such aspects and their equivalents. Other advantages and novel features of the subject matter can become apparent from the following detailed description when considered in conjunction with the drawings.

DETAILED DESCRIPTION

Figure 1:
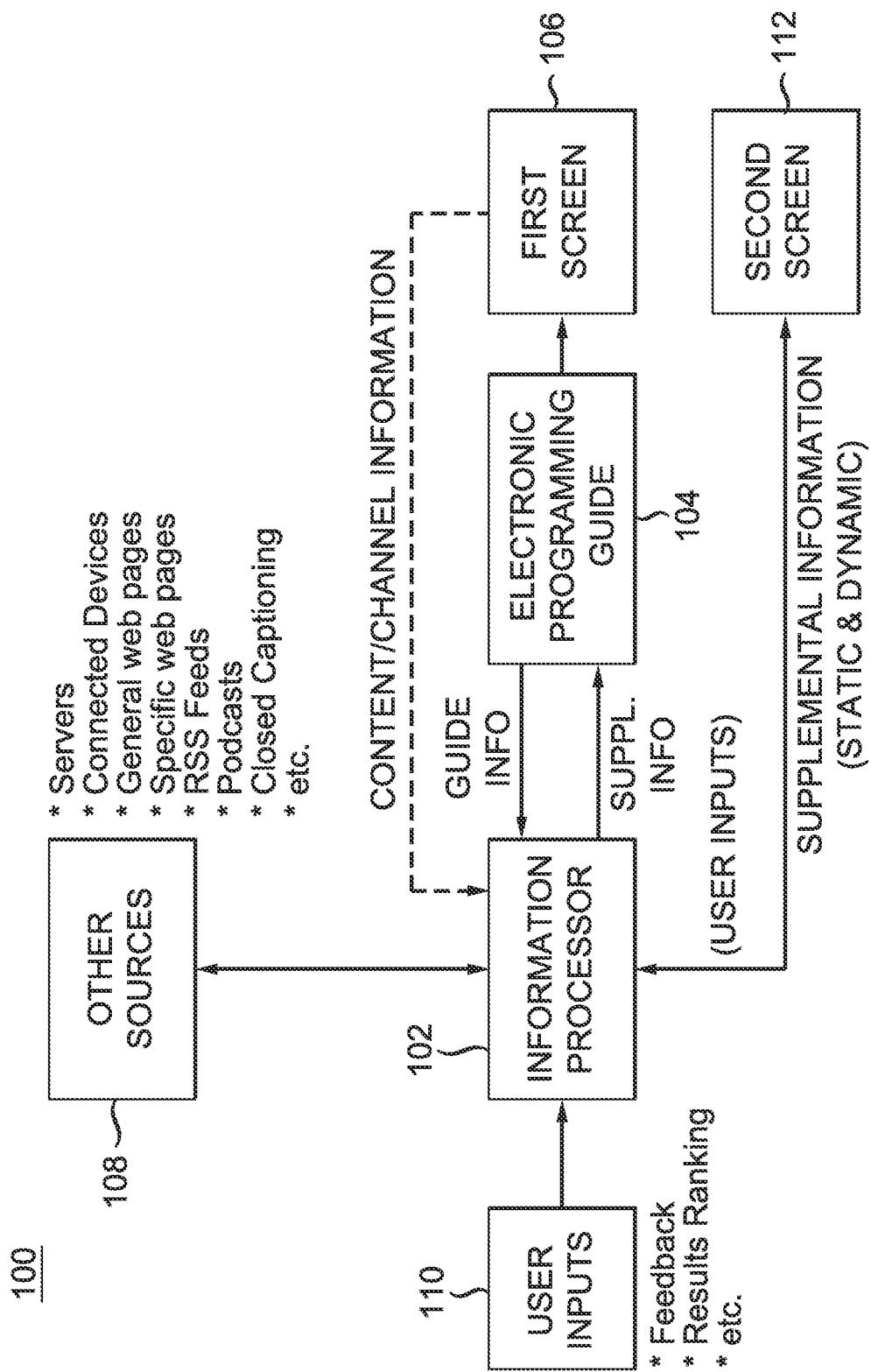
FIG. 1 is an example of a system utilized to supplement information associated with a given media content.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details. In other instances, well-known structures and devices are shown in block diagram form in order to facilitate describing the embodiments.

As used in this application, the term "component" is intended to refer to hardware, software, or a combination of hardware and software in execution. For example, a component can be, but is not limited to being, a process running on a processor, a processor, an object, an executable, and/or a microchip and the like. By way of illustration, both an application running on a processor and the processor can be a component. One or more components can reside within a process and a component can be localized on one system and/or distributed between two or more systems. Functions of the various components shown in the figures can be provided through the use of dedicated hardware as well as hardware capable of executing software in association with appropriate software.

Although the following descriptions can refer to a system that utilizes a first screen and a second screen, the principles described can be utilized to augment any program guide displayed on single and/or multiple screen systems. The screen devices can include television sets, monitors, handheld devices such as personal digital assistants (PDA), smart phones, wireless/wired pads, laptops, etc.

In one instance, a web page associated with a program channel with no electronic guide information is mined to populate the guide and/or a $2^{nd}$ screen with information associated with the program. That is, the information is not necessarily added directly to the original programming guide. In can, instead, be displayed on a subsequent viewing/screening device and the like. For example, the "CNN Newsroom" program generally does not have information regarding the content of the program. If no information can be obtained from the electronic programming guide, then a CNN web page and the like can be mined for current topics, most popular topics, etc. RSS (Really Simple Syndication) feeds can also be mined to determine associated information. It is also possible to mine closed captioning feeds to create information content about a program. Should associated web pages prove unproductive or unavailable, general web news sources can be mined to provide probable news content that is likely to be discussed during the news program. These general news sources can include, Google News, Yahoo News, etc. Other types of programs besides news can employ similar techniques to find information associated with a program.

The RSS feeds can also be used as a filter for in-program content for closed captioning data. Since the close captioning data does not have any contextual information, the raw text from the captions can be used and lined up with current articles. These articles can then be highlighted in real-time on, for example, a secondary screen as the program progresses. This gives the user a sense of related information based on what is being presented on, for example, a first screen and enables a sense of interactivity by clicking on the articles to read more about the story.

In one example, an electronic programming guide (EPG) is received. The information contained within the guide is utilized as a "seed" to determine what information is to be gathered and/or mined. For example, RSS information can be based on what information is gleaned from the EPG (e.g., title and/or channel of the program, etc.). This enables an "enhanced" EPG or EEPG to be created for each program. During the initial mining process, official sites associated with a program and/or channel are searched. Once this is known, the official web page, for example, can be used as a starting point to detect RSS feeds on that site. If no RSS sites are detected, generic RSS sites can be used as a fallback position. In another instance, a user can provide a set of RSS sources that he/she prefers and the like. This user submitted list can then be used to mine information such as news articles and/or blog articles and the like and display relevant information to the user when they tune to a relevant channel.

In some instances, the mined data is further processed before being available for display to a user. For example, if the format of the raw data is not compatible with a screen device, it can be reformatted as appropriate (HTML sourced data or plain text formatted to fit a screen's user interface (UI) elements and the like). The mined data can include trailers, videos, news texts, links and/or images and the like. If a screen device is not capable of displaying an image, associated meta data for the image could be used in its place, etc. It is also possible for a user to provide feedback regarding the mined and/or displayed information. In one instance, a user can provide results ranking before, during and/or after viewing information and/or the actual programming. For example, news articles can be ranked based on how relevant it is to the topic that was actually discussed during the viewed programming. The user can also provide rankings based on how relevant the information is to the user themselves.

In another example using news feeds, a server running on a set top box (STB) fetches (via wired and/or wireless means over the Internet, etc.) and formats associated information that is viewed on any connected machines (wired and/or wireless). This can be cached on the STB and then displayed to a user when they tune to a channel associated with the cached information and/or the server on the STB can dynamically fetch this information when a user is tuned to the channel. In this manner, any device can connect to a "cloud" STB and the like.

Other examples can leverage remote servers that search, retrieve, filter and/or format associated programming guide information. This type of system can allow for more intricate servers to service electronic devices in a user's home that do not possess the power and speed that a dedicated server can provide. The home electronic device can then request information from the remote server as needed (e.g., when a user tunes to watch a particular program, etc.).

FIG. 1 is an example of a system 100 utilized to supplement information associated with a given media content. An information processor 102 is used to associate supplemental information with media related information. In one example, this is accomplished by the information processor 102 receiving electronic guide information from an electronic program guide 104. The information processor 102 can then check with other sources 108 to determine if additional information can be obtained relating to content in the electronic programming guide 104. Once the information processor 102 compiles associated information, the supplemental information is combined with the original electronic programming guide 104 to form an enhanced electronic programming guide. This enhanced electronic programming guide can then be displayed on a first screen 106 (e.g., a primary screen) and/or on a second screen 112 (e.g., secondary screen—handheld device, cell phone, laptop, pad, etc.).

The other sources 108 can include, but are not limited to, servers (e.g., specialty servers that generate content associated materials, etc.), connected devices (e.g., devices that are connected wired and/or wirelessly to a device that the system 100 resides in/with, etc.), general web pages (e.g., general news), specific web pages (e.g., specific news channel, etc.), RSS feeds, podcasts and/or closed captioning and the like. The information processor 102 can use the closed captioning and/or RSS feeds and the like to generate dynamic supplemental information that can be displayed on the second screen and the like 112 (e.g., displaying articles associated with a topic currently being discussed, etc.). One skilled in the art can appreciate that dynamic information supplied by the information processor can also be displayed on the first screen as well as any other screen. The system is not limited to only a first and second screen. Some examples do not employ an electronic programming guide as a seed for gathering information. In one example, the information processor 102 can receive content and/or channel information from a first screen 106 and the like. This permits the information processor to obtain associated information directly from a set top box tuner, etc. to seed its search of relevant material.

The information processor 102 can also accept user inputs 110. These inputs can include, but are not limited to, feedback such as results rankings and the like. The user inputs 110 can be received directly and/or via the second screen 112 and the like. The user inputs 110 can be used by the information processor to provide better relevancy. The improvements in supplemental information can be made in regard to the user's preferences and/or the user's ranking of the information relative to the content on the first screen 106 and the like.

Figure 2:
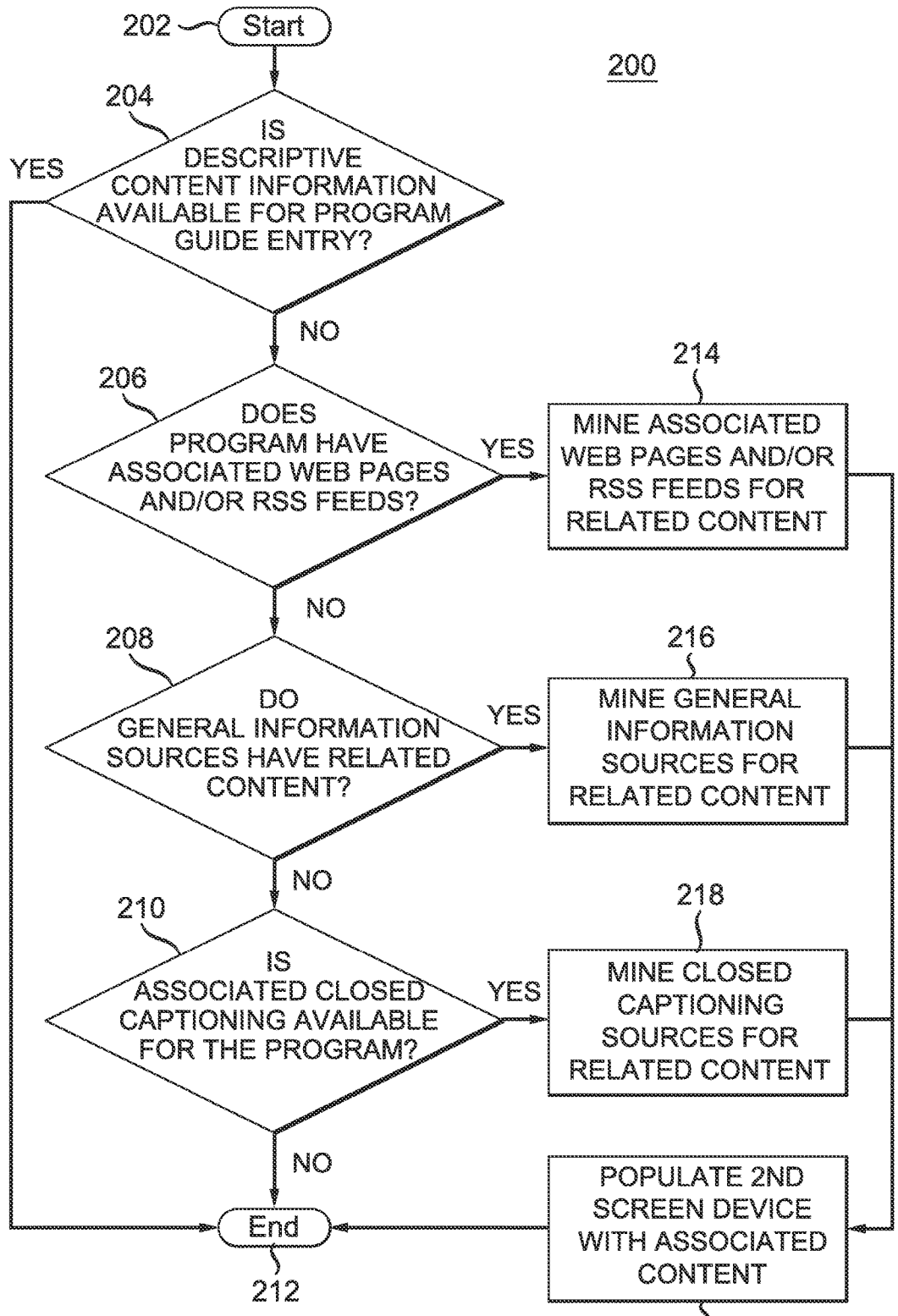
FIG. 2 is a flow diagram of a method of generating supplemental content information.

In view of the exemplary systems shown and described above, methodologies that can be implemented in accordance with the embodiments will be better appreciated with reference to the flow chart of FIG. 2. While, for purposes of simplicity of explanation, the methodologies are shown and described as a series of blocks, it is to be understood and appreciated that the embodiments are not limited by the order of the blocks, as some blocks can, in accordance with an embodiment, occur in different orders and/or concurrently with other blocks from that shown and described herein. Moreover, not all illustrated blocks may be required to implement the methodologies in accordance with the embodiments.

FIG. 2 is a flow diagram of a method 200 of generating supplemental content information. The example method starts 202 by determining if content information is available for program guide entry 204. The determination can also be whether additional information is available beyond what is supplied by the program guide (e.g., an enhancement of information already supplied by the programming guide for a particular channel, time, etc.). In other examples, a determination could be made as to whether a tuned channel and/or other channel information is available. If yes, the flow can end 212. If no, a determination is made as to whether there are other sources of information available 206, 208, 210. If a program has associated web pages and/or RSS feeds, these sources can be mined for related content 214. If not, but there are general information sources related to the content, the general information sources are mined for related content 216. If not, but there are closed captioning available for the program, the closed captioning can be mined for related content 218. One skilled in the art can appreciate that each type of source is not mutually exclusive despite the flow. In other words, a combination of sources can be mined and processed to yield the supplemental/associated content information. In one example, these types of mined and/or processed information can be populated on a secondary screen 220.

What has been described above includes examples of the embodiments. It is, of course, not possible to describe every conceivable combination of components or methodologies for purposes of describing the embodiments, but one of ordinary skill in the art can recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. An apparatus comprising:
a first screen;
a memory; and
an information processor configured to:
receive an electronic programming guide comprising a program guide channel entry, the electronic programming guide displayed on the first screen;
determine whether descriptive content information is available in the electronic program guide for the program guide channel entry;
if the descriptive content information is determined to be not available in the electronic program guide for the program guide channel entry, then:
determine whether at least one information source other than the program guide contains additional information related to the program guide channel entry;
search the at least one information source for the additional information related to the program guide channel entry;
estimate content that is likely being presented by the program guide channel entry based at least partially on a relevancy ranking associated with the additional information from the at least one information source, wherein the relevancy ranking is accepted from a user via a second screen; and
display specific information related to the program guide channel entry based on the estimate.

2. The apparatus of claim 1, wherein the memory is configured to store the specific information based on an association with the program guide channel entry, wherein the information processor is further configured to retrieve the specific information from the memory when the program guide channel entry is selected.

3. The apparatus of claim 1, wherein the at least one information source comprises a website associated with the program guide channel entry.

4. The apparatus of claim 1, wherein the at least one information source comprises a really simple syndication feed associated with the program guide channel entry.

5. The apparatus of claim 1, wherein the at least one information source comprises a closed captioning feed associated with the program guide channel entry.

6. The apparatus of claim 5, wherein the information processor is further configured to populate the electronic programming guide being displayed on the first screen with the specific information to display the specific information.

7. The apparatus of claim 1, wherein the information processor is further configured to display the specific information separately from the electronic information guide.

8. A method comprising:
receiving an electronic programming guide comprising a program guide channel entry, the electronic programming guide displayed on a first screen;
determining whether descriptive content information is available in the electronic program guide for the program guide channel entry;
if the descriptive content information is determined to be not available in the electronic program guide for the program guide channel entry, then:
determining whether at least one information source other than the electronic program guide contains additional information related to the program guide channel entry;
searching the at least one information source for the additional information related to the program guide channel entry; and
estimating content that is likely being presented by the program guide channel entry based at least partially on a relevancy ranking associated with the additional information from the at least one information source, wherein the relevancy ranking is accepted from a user via a second screen; and
displaying specific information related to the program guide channel entry based on the estimating of content.

9. The method of claim 8 wherein displaying the specific information further comprises populating the electronic programming guide being displayed on the first screen with the specific information.

10. The method of claim 9, wherein the at least one information source comprises a website associated with the program guide channel entry.

11. The method of claim 8 wherein the at least one information source comprises a really simple syndication feed associated with the program guide channel entry.

12. The method of claim 11 wherein the at least one information source comprises a closed captioning feed associated with the program guide channel entry.

13. The method of claim 8 wherein displaying the specific information comprises displaying the specific information separately from the electronic information guide.

14. The method of claim 8, further comprising:
storing the specific information in a memory; and
retrieving the specific information from the memory when the program guide channel entry is selected.

15. A set top box comprising:
a memory; and
a microchip configured to:
receive an electronic programming guide comprising a program guide channel entry, the electronic programming guide displayed on a first screen;
determine whether descriptive content information is available in the electronic program guide for the program guide channel entry;
if the descriptive content information is determined to be not available in the electronic program guide for the program guide channel entry, then:
determine whether at least one information source other than the electronic program guide contains additional information related to the program guide channel entry;
search the at least one information source for additional information related to the program guide channel entry;
estimate content that is likely being presented by the program guide channel entry based at least partially on a relevancy ranking associated with the additional information from the at least one information source, wherein the relevancy ranking is accepted from a user via a second screen;

store specific information related to program guide channel entry in the memory;

retrieve the specific information from the memory, when selection of the program guide channel entry is detected; and display the specific information.

16. A method comprising:

receiving, using a microchip, an electronic programming guide comprising a program guide channel entry, the electronic programming guide displayed on a first screen;

determining, using the microchip, whether descriptive content information is available in the electronic program guide for the program guide channel entry;

if the descriptive content information is determined to be not available in the electronic program guide for the program guide channel entry, then:

determining, using the microchip, whether at least one information source different from the electronic program guide contains additional information related to the program guide channel entry;

searching, using the microchip, the at least one information source for the additional information related to the program guide channel entry;

estimating, using the microchip, content that is likely being presented by the program guide channel entry based at least partially on a relevancy score associated with the program guide channel entry, wherein the relevancy score is accepted from a user via a second screen;

storing, using the microchip, specific information related to the program guide channel entry in a memory; and retrieving, using the microchip, specific information from the memory, when selection of the program guide channel entry is detected; and displaying the specific information.

* * * * *